US010843136B2

(12) United States Patent
Cordatos et al.

(10) Patent No.: US 10,843,136 B2
(45) Date of Patent: Nov. 24, 2020

(54) SELECTIVELY PERMEABLE MEMBRANE DEVICES

(71) Applicant: Hamilton Sundstrand Corporation, Charlotte, NC (US)

(72) Inventors: Haralambos Cordatos, Colchester, CT (US); Sergei F. Burlatsky, West Hartford, CT (US); Zissis A. Dardas, Worcester, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 191 days.

(21) Appl. No.: 16/105,702

(22) Filed: Aug. 20, 2018

(65) Prior Publication Data

US 2020/0054997 A1 Feb. 20, 2020

(51) Int. Cl.

| | |
|---|---|
| ***B01D 63/06*** | (2006.01) |
| ***B01D 19/00*** | (2006.01) |
| ***F02M 37/22*** | (2019.01) |

(52) U.S. Cl.

CPC ......... *B01D 63/06* (2013.01); *B01D 19/0031* (2013.01); *F02M 37/22* (2013.01); *B01D 2313/086* (2013.01)

(58) Field of Classification Search

CPC .... B01D 19/0031; B01D 53/22; B01D 69/06; B01D 2313/086; B01D 2321/2016; B64D 37/32

See application file for complete search history.

(56) References Cited

U.S. PATENT DOCUMENTS 3,256,678 A * 6/1966 Bertin .................... B01D 53/22 96/4
3,672,509 A * 6/1972 Buchmann ............. B01D 63/06 210/321.63
4,075,091 A * 2/1978 Bellhouse .............. B01D 63/06 210/637
5,611,841 A * 3/1997 Baker .................... B01D 53/22 95/50
5,762,870 A * 6/1998 Vallana .................. B01D 63/06 210/247
9,700,816 B2 7/2017 Liu et al.
(Continued)

FOREIGN PATENT DOCUMENTS

CN 104209006 B 8/2016
EP 1544437 A2 6/2005
(Continued)

OTHER PUBLICATIONS

Extended European search report issued in correspnding EP application No. 19192501.5, dated Jan. 27, 2020.

*Primary Examiner* — Jason M Greene
(74) *Attorney, Agent, or Firm* — Locke Lord LLP; Daniel J. Fiorello; Scott D. Wofsy

(57) ABSTRACT

A selectively permeable membrane device for separating a first fluid from a second fluid in a flow can include a membrane conduit configured to receive the flow and to allow permeation of the first fluid therethrough, and configured to not allow permeation of the second fluid. The device can include a residence time enhancing structure disposed within the membrane conduit and configured to increase residence time of the flow within the membrane conduit.

14 Claims, 2 Drawing Sheets

FUEL + $O_2$ 99 $O_2$ 100 97 107 101 109 111 105 $O_2$ FUEL 103 98

(56) References Cited

U.S. PATENT DOCUMENTS

| | | | | |
|---|---|---|---|---|
| 2007/0163433 | A1* | 7/2007 | Chen | B01D 19/0031<br>95/46 |
| 2009/0145761 | A1 | 6/2009 | Van Hassel | |
| 2016/0007588 | A1* | 1/2016 | Levesque | B01D 19/0031<br>435/2 |

FOREIGN PATENT DOCUMENTS

| | | | |
|---|---|---|---|
| JP | 2002200414 | A | 7/2002 |
| RU | 33391 | U1 | 10/2003 |
| WO | 81/02683 | A1 | 10/1981 |
| WO | WO-2010024291 | A1 | 3/2010 |

* cited by examiner

SELECTIVELY PERMEABLE MEMBRANE DEVICES

BACKGROUND

1. Field

The present disclosure relates to selectively permeable membrane, e.g., for fuel deoxygenation or any other suitable use.

2. Description of Related Art

Fuel deoxygenation requires large membrane surface, and is currently accomplished with polymeric hollow-fibers. Ceramic membranes are typically unsuitable for fuel deoxygenation because they are only available as large tubes and would require large, heavy systems.

Such conventional methods and systems have generally been considered satisfactory for their intended purpose. However, there is still a need in the art for improved selectively permeable membrane devices. The present disclosure provides a solution for this need.

SUMMARY

In accordance with at least one aspect of this disclosure, a selectively permeable membrane device for separating a first fluid from a second fluid in a flow can include a membrane conduit configured to receive the flow and to allow permeation of the first fluid therethrough, and configured to not allow permeation of the second fluid. The device can include a residence time enhancing structure disposed within the membrane conduit and configured to increase residence time of the flow within the membrane conduit.

The resident time enhancing structure can include a screw configured to cause the flow to follow a rotational path within the membrane conduit. The screw can be attached to or formed on a center rod. The screw can include a double helix shape.

An outer diameter of the screw can be attached to or formed integrally with an inner diameter of the membrane conduit. The screw and/or rod can be formed from a non-reactive material (e.g., stainless steel). In certain embodiments, the screw and/or rod can be formed of a reactive material configured to absorb the first fluid from the flow, but not the second fluid.

The membrane conduit can have a cylindrical tube shape. Any other suitable shape is contemplated herein (e.g., a polygonal cross-sectional shape).

The membrane conduit can be formed from a fuel deoxygenation material such that the first fluid is oxygen and the second fluid is fuel. For example, the membrane conduit can be formed from zeolite, or any other suitable material.

In certain embodiments, the device can include one or more eddy promoting features disposed on an inner diameter of the membrane conduit to enhance mixing. Any other suitable alternative and/or additional placement of one or more eddy promoting features is contemplated herein.

In accordance with at least one aspect of this disclosure, a fuel deoxygenation system can include a selectively permeable membrane conduit configured to receive fuel flow and to allow permeation of the oxygen through the membrane conduit, and configured to not allow permeation of the fuel through the membrane conduit. The selectively permeable membrane conduit can be similar to the membrane conduit described above. The system can include a residence time enhancing structure disposed within the membrane conduit and configured to increase residence time of the fuel within the membrane conduit. The residence time enhancing structure can be the same as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
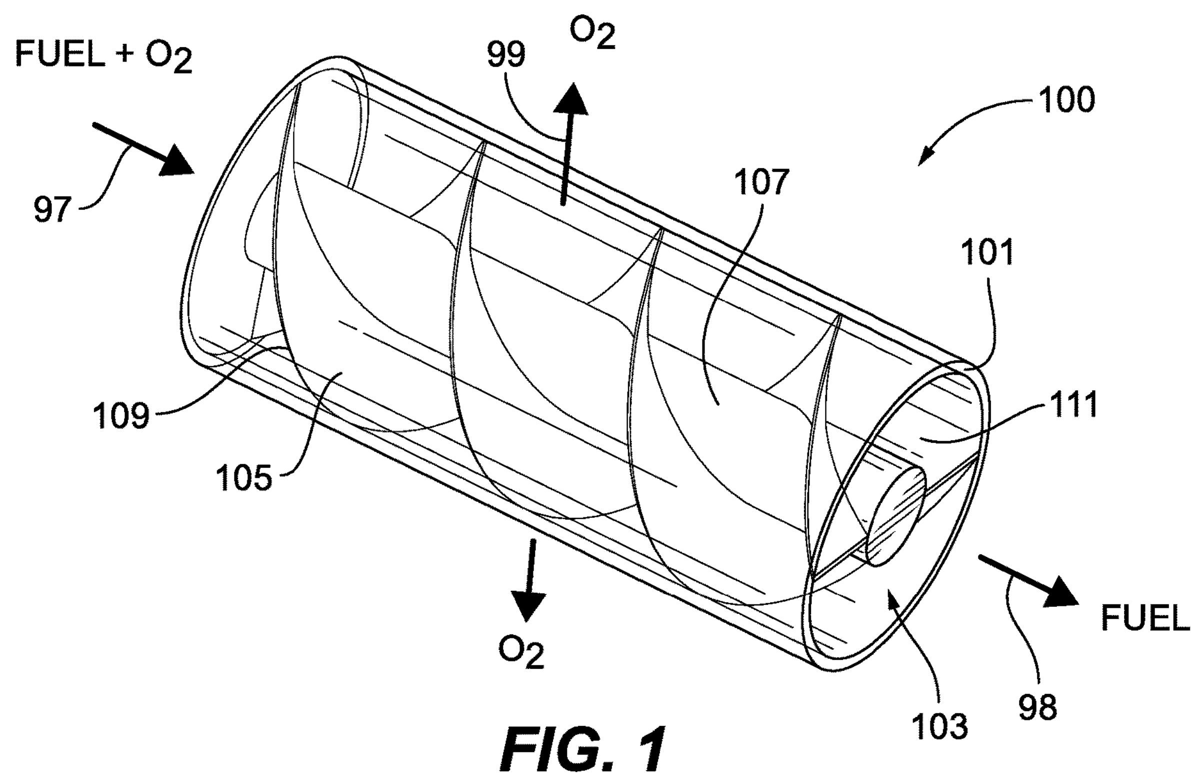
FIG. 1 is a perspective view of an embodiment of a device in accordance with this disclosure.
Figure 2:
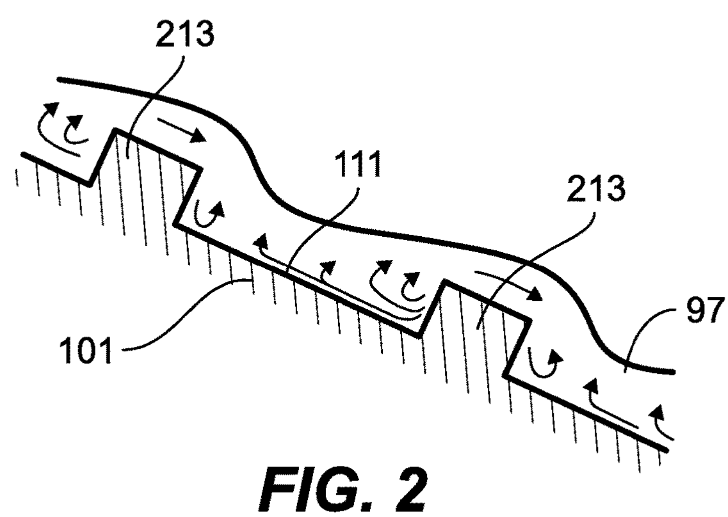
FIG. 2 is a schematic cross-sectional view of an embodiment of a device in accordance with this disclosure, showing eddy promoting features disposed thereon.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIG. 2. The systems and methods described herein can be used to improve fluid separation, e.g., for fuel deoxygenation or any other use.

Referring to FIG. 1, a selectively permeable membrane device 100 for separating a first fluid 99 from a second fluid 98 in a flow 97 can include a membrane conduit 101 configured to receive the flow 97 (e.g., from a fuel tank) and to allow permeation of the first fluid 99 through the membrane conduit 101, e.g., as shown. The membrane conduit is configured to not allow permeation of the second fluid 98 therethrough.

The device 100 can include a residence time enhancing structure 103 disposed within the membrane conduit 101 and configured to increase residence time of the flow 97 within the membrane conduit 101. In certain embodiments, the resident time enhancing structure 103 can include a screw 105 configured to cause the flow to follow a rotational path within the membrane conduit 101.

In certain embodiments, the screw 105 can be attached to (e.g., via welding, via adhesive) or formed on (e.g., via casting, via additive manufacturing) a center rod 107. The center rod 107 need not be used in certain embodiments, and any support structure for the screw 105 is contemplated herein. In certain embodiments, it is contemplated that the center rod 107 can be a membrane conduit in addition to or alternative to membrane conduit 101 such that a first fluid can flow through the center rod 107 radially inwardly to be separated.

As shown, the screw 105 can include a double helix shape (e.g., a reverse Archimedes screw). Any other suitable shape is contemplated herein (e.g., a single helix, multi-helix).

In certain embodiments, an outer diameter 109 of the screw 105 can be attached to or formed integrally (e.g., via additive manufacturing) with an inner diameter 111 of the membrane conduit 101. In certain embodiments, the screw 105 may be sealed (e.g., via a connection to the membrane conduit 101, or otherwise sealed) to the membrane conduit 101 to form one or more sealed channels (e.g., one for each helix). Any other suitable connection to the membrane conduit 101 is contemplated herein. It is contemplated that the screw 105 need not be attached to the membrane conduit 101, and may be slid into the membrane conduit 101 to be removable.

In certain embodiments, the screw 105 and/or rod 107 can be formed from a non-permeable material (e.g., stainless steel). In certain embodiments, the screw 105 and/or rod 107 can be formed of a permeable material configured to absorb the first fluid 99 from the flow 97, but not the second fluid 98. One having ordinary skill in the art knows what materials are suitable based on the application (e.g., based on the fluid to be absorbed). For example, one having ordinary skill in the art knows what material to select to absorb oxygen. Over time, the material may become saturated and no longer absorb, and can be removed and replaced in certain embodiments.

The membrane conduit 101 can have a cylindrical tube shape. Any other suitable shape is contemplated herein (e.g., a polygonal cross-sectional shape).

In certain embodiments, the membrane conduit 101 can be formed from a fuel deoxygenation material such that the first fluid 99 is oxygen and the second fluid 98 is fuel. For example, the membrane conduit 101 can be formed from zeolite or coated with a zeolite film, or can be made of or utilize any other suitable material.

Referring additionally to FIG. 2, in certain embodiments, the device 100 can include one or more eddy promoting features 213 disposed on the inner diameter 111 of the membrane conduit 101, e.g., to enhance mixing. Any other suitable alternative and/or additional placement of one or more eddy promoting features 213 is contemplated herein. The eddy promoting features 213 can be formed integrally with the membrane conduit 101 (e.g., via additive manufacturing), or attached in any suitable way.

Figure 3:
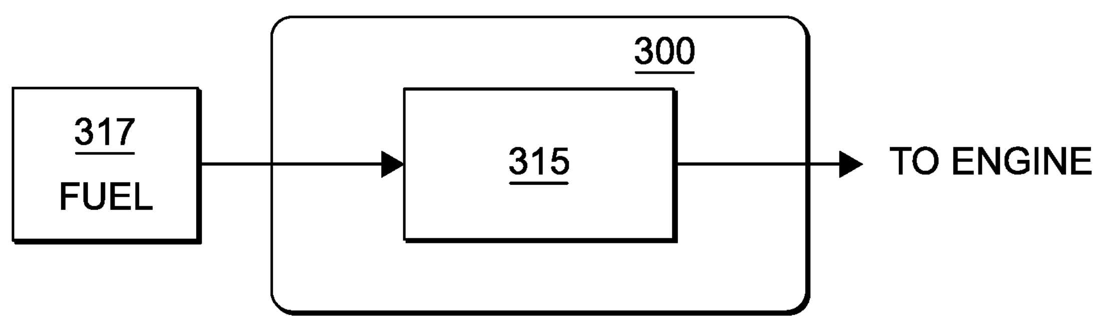
FIG. 3 is a schematic view of an embodiment of a system in accordance with this disclosure.

In accordance with at least one aspect of this disclosure, referring additionally to FIG. 3, a fuel deoxygenation system 300 can include a selectively permeable membrane conduit 315 configured to receive fuel flow (e.g., from fuel tank 317) and to allow permeation of the oxygen through the membrane conduit 315. The membrane conduit 315 is configured to not allow permeation of the fuel through the membrane conduit 317. The selectively permeable membrane conduit 315 can be similar to the membrane conduit 100 described above.

The system 300 can include a residence time enhancing structure (e.g., not shown in FIG. 3) in accordance with any embodiment disclosed above, disposed within the membrane conduit 315, and configured to increase residence time of the fuel within the membrane conduit 315.

Embodiments cause a long contact length between membrane and flow (e.g., fuel), thereby increasing effective membrane length. Optional eddy-promoting features on pipe can break up the boundary layer to further improve external mass transfer and therefore overall membrane performance. Since the bottleneck in fuel deoxygenation is oxygen transfer from the bulk of the fuel to the membrane surface, increasing the effective membrane length is equivalent to increasing surface area, thus providing a path for using, e.g., tubular ceramic membranes.

Ceramic membranes can have distinct advantages over polymeric membranes, but their tubular structure affords very low surface area. Also, unlike polymeric membranes, ceramic membranes are brittle and cannot be formed into small hollow fibers as is currently practice with polymer-based membranes. As a result, one can package much more membrane surface area per unit volume with a polymeric membrane.

Embodiments can be used for fuel stabilization. Embodiments can be used for, e.g., oxygen and/or moisture removal from other fluids, e.g., lubrication oils (e.g., to mitigate corrosion and increase part life), olive oil, and/or fragrant oils (to increase quality). Any other suitable fluid removal for any suitable application is contemplated herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A selectively permeable membrane device for separating a first fluid from a second fluid in a flow, comprising:

a membrane conduit configured to receive the flow and to allow permeation of the first fluid therethrough, and configured to not allow permeation of the second fluid; and a residence time enhancing structure disposed within the membrane conduit and configured to increase residence time of the flow within the membrane conduit, wherein the resident time enhancing structure includes a screw configured to cause the flow to follow a rotational path within the membrane conduit, wherein the screw is attached to or formed on a center rod, and wherein the screw and/or rod are formed of a reactive material configured to absorb the first fluid from the flow, but not the second fluid.

2. The device of claim 1, wherein the screw includes a double helix shape.

3. The device of claim 1, wherein an outer diameter of the screw is attached to or formed integrally with an inner diameter of the membrane conduit.

4. The device of claim 1, wherein the screw or rod is formed from a non-reactive material.

5. The device of claim 1, wherein the membrane conduit has a cylindrical tube shape.

6. The device of claim 1, wherein the membrane conduit is formed from a fuel deoxygenation material such that the first fluid is oxygen and the second fluid is fuel.

7. The device of claim 1, further comprising one or more eddy promoting features disposed on an inner diameter of the membrane conduit to enhance mixing.

8. A fuel deoxygenation system, comprising:

a selectively permeable membrane conduit configured to receive fuel flow and to allow permeation of the oxygen through the membrane conduit, and configured to not allow permeation of the fuel through the conduit; and a residence time enhancing structure disposed within the membrane conduit and configured to increase residence time of the fuel within the membrane conduit, wherein the resident time enhancing structure includes a screw configured to cause the flow to follow a rotational path within the membrane conduit, wherein the screw is attached to or formed on a center rod, and wherein the screw and/or rod are formed of a permeable material configured to absorb oxygen but not fuel.

9. The system of claim 8, wherein the screw includes a double helix shape.

10. The system of claim 8, wherein an outer diameter of the screw is attached to or formed integrally with an inner diameter of the membrane conduit.

11. The system of claim 8, wherein the screw or rod is formed from a non-permeable material.

12. The system of claim 8, wherein the membrane conduit has a cylindrical tube shape.

13. The system of claim 8, wherein the membrane conduit is formed from a fuel deoxygenation material such that the first fluid is oxygen and the second fluid is fuel.

14. The system of claim 8, further comprising one or more eddy promoting features disposed on an inner diameter of the membrane conduit to enhance mixing.

* * * * *